(12) United States Patent
Leicht et al.

(10) Patent No.: US 8,997,466 B2
(45) Date of Patent: Apr. 7, 2015

(54) MIXING AND/OR EVAPORATING DEVICE (71) Applicant: J. Eberspächer GmbH & Co. KG, Esslingen (DE)

(72) Inventors: Sebastian Leicht, Bisingen (DE); Felix Neumann, Esslingen (DE); Benjamin Arlt, Aichwald (DE); Oleksandr Semenov, Plochingen (DE); Silvia Calvo, Esslingen (DE); Joachim Braun, Esslingen (DE); Tobias Wolf, Köngen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 161 days.

(21) Appl. No.: 13/628,931

(22) Filed: Sep. 27, 2012

(65) Prior Publication Data

US 2013/0074480 A1 Mar. 28, 2013

(30) Foreign Application Priority Data

Sep. 28, 2011 (DE) .................. 10 2011 083 636

(51) Int. Cl.
| | |
|---|---|
| *F01N 3/00* | (2006.01) |
| *B01F 3/04* | (2006.01) |
| *B01F 5/04* | (2006.01) |
| *B01F 5/06* | (2006.01) |
| *F01N 3/20* | (2006.01) |
| *F01N 3/28* | (2006.01) |

(52) U.S. Cl.
CPC ........... *B01F 3/04049* (2013.01); *B01F 5/0473* (2013.01); *B01F 5/0616* (2013.01); *F01N 3/2066* (2013.01); *F01N 3/2892* (2013.01); *B01F 2005/0623* (2013.01); *B01F 2005/0627* (2013.01); *B01F 2005/0639* (2013.01)

(58) Field of Classification Search
CPC .. B01F 5/0473; B01F 5/0616; B01F 3/04049; B01F 2005/0639; B01F 2005/0623; B01F 2005/0627; F01N 3/2892; F01N 3/2066
USPC .................................................... 60/272–324
See application file for complete search history.

(56) References Cited

U.S. PATENT DOCUMENTS 5,489,153 A * 2/1996 Berner et al. ................. 366/337
7,793,494 B2 * 9/2010 Wirth et al. ..................... 60/324
(Continued)

FOREIGN PATENT DOCUMENTS

DE 10 2007 040360 A1 4/2008
DE 10 2009 054 356 A1 6/2010
(Continued)

*Primary Examiner* — Jesse Bogue
(74) *Attorney, Agent, or Firm* — McGlew and Tuttle, P.C.

(57) ABSTRACT

A mixing and/or evaporating device (12) for an exhaust system (5) of a combustion engine (1), in particular of a motor vehicle, includes a support body (19), which encloses a flat cross section through which a flow can flow running transversely to the axial direction (20) of the device (12) in the circumferential direction (32). The support body (19) comprises two long side walls (21, 22) located opposite each other and two short side walls (23, 24) located opposite each other, wherein the short side walls (23, 24) each connect the two long side walls (21, 22) with each other. At least on one long side wall (21, 22) at least on one axial end (26, 27), a plurality of guide blades (25) is arranged. The guide blades (25) stand away in a direction of the other long side wall (21, 22) and are angled relative to the axial direction (20).

20 Claims, 6 Drawing Sheets

(56) References Cited

U.S. PATENT DOCUMENTS

| | | |
|---|---|---|
| 7,805,932 B2 | 10/2010 | Oxborrow |
| 7,908,845 B2 * | 3/2011 | Brown et al. .................. 60/286 |
| 8,375,708 B2 * | 2/2013 | Forster et al. ................. 60/324 |
| 8,572,949 B2 * | 11/2013 | Wirth ............................. 60/286 |
| 2008/0250776 A1 * | 10/2008 | Brown et al. .................. 60/299 |
| 2008/0267780 A1 | 10/2008 | Wirth |
| 2010/0074814 A1 * | 3/2010 | Drost ........................... 422/225 |
| 2010/0132345 A1 * | 6/2010 | Solbrig et al. ................. 60/301 |
| 2010/0218490 A1 * | 9/2010 | Forster et al. ................. 60/324 |
| 2011/0146254 A1 * | 6/2011 | Yi et al. ......................... 60/310 |

FOREIGN PATENT DOCUMENTS

| | | |
|---|---|---|
| EP | 0 430 973 A1 | 6/1991 |
| EP | 0 894 523 A1 | 2/1999 |
| JP | 2008-274941 A | 11/2008 |
| WO | 90/00929 A1 | 2/1990 |

* cited by examiner

MIXING AND/OR EVAPORATING DEVICE

CROSS REFERENCE TO RELATED APPLICATIONS

This application claims the benefit of priority under 35 U.S.C. §119 of German Patent Application DE 10 2011 083 636.5 filed Sep. 28, 2011, the entire contents of which are incorporated herein by reference.

FIELD OF THE INVENTION

The present invention relates to a mixing and/or evaporating device for an exhaust system of a combustion engine, in particular of a motor vehicle. The invention additionally relates to an exhaust system equipped with such a device and to an SCR catalytic converter equipped with such a device.

BACKGROUND OF THE INVENTION

Usually, an exhaust system of a combustion engine is equipped with devices for cleaning or re-treating the exhaust gases conducted away from the combustion engine. There it can be necessary to introduce a liquid educt into the exhaust gas flow, to evaporate it therein and intermix it with the exhaust gas. For example, it may be required to admix a fuel to the exhaust gas upstream of an oxidation catalytic converter in order to bring about a heating-up of the exhaust gas flow through an exothermic conversion of the fuel in the oxidation catalytic converter. The heated-up exhaust gas flow can then be utilized downstream of the oxidation catalytic converter for heating up a further exhaust gas treatment device to operating temperature or to regeneration temperature, for example another catalytic converter or a particle filter. Furthermore, SCR systems are known, which operate with selective catalytic reaction and are equipped with an SCR catalytic converter which absorbs NOx from the exhaust gas flow. Upstream of the SCR catalytic converter a suitable reaction agent is fed to the exhaust gas flow, for example ammonia or urea, preferentially a watery urea solution. In the SCR catalytic converter the ammonia then causes a conversion of the embedded nitric oxides into nitrogen and water.

With respect to all educts fed into the exhaust gas flow in liquid form it is true that the desired effect can be satisfactorily achieved only when between the introduction point of the liquid educt and a consumer location of the educt an adequate evaporation of the educt as well as an adequate mixing-through of the gaseous educt with the exhaust gas flow can take place. For this purpose, the mixing and/or evaporating devices mentioned at the outset are employed, which are arranged in the flow path of the exhaust gas between the introduction point of the educt and the consumption point of the educt.

SUMMARY OF THE INVENTION

The present invention deals with the problem of providing an improved or at least another embodiment for a device of the type mentioned at the outset or for an SCR catalytic converter equipped with such or for an exhaust system equipped with such, which is characterized by a simple and thus cost-effective construction, while in addition a low through-flow resistance is aimed at. Furthermore, an improved flow distribution over the cross section is aimed at, which advantageously leads to a reduction of the back pressure.

The invention is based on the general idea of equipping the mixing and/or evaporating device with a support body, which encloses, in the circumferential direction, a flat cross section of the device through which a flow can flow running transversely to the axial direction of the device. The support body thus does not define a circular cross section, but an elongated or flat cross section in such a manner that the support body comprises two long side walls located opposite each other and two short side walls located opposite each other, wherein the short side walls each connect the two long side walls with each other. Through the proposed configuration of the support body with a flat cross section according to the invention it is possible to arrange a plurality of guide blades at least on a long side wall at least on an axial end of the side wall or of the support body, which stand (extend) away in the direction of the other long side wall and which are angled at a blade angle relative to the axial direction. Through this design, the guide blades extend transversely to the axial direction and are additionally arranged transversely to the axial direction as well as transversely to their longitudinal direction next to one another. The axial direction of the device in this case corresponds to a main flow direction of the exhaust gas through the device. This main flow direction in this case does not take into account flow deflections, transverse flows, backflows, swirls and the like within the cross section through which a flow can flow.

At the respective axial end of the respective long side wall, a series of guide blades, arranged next to one another, in particular running parallel to one another is thus provided, each of which brings about a flow deflection in the direction of a short side wall. On the one hand, the guide blades of a respective linear guide blade row offer a comparatively large impact area for liquid educt introduced into the exhaust gas flow upstream thereof, so that the liquid can strike the guide blades and evaporate on these. On the other hand, the guide blades cause an intensive flow deflection, which promotes the mixing-through of the evaporated educt with the exhaust gas flow.

Preferably, the guide blades can project, in this case, substantially perpendicularly from the respective side wall, i.e. at an angle of 90°±10°. Thereby, the guide blades remain in particular within an enclosure formed by the support body.

Advantageously, the support body can be produced from a flat web material by deformation, which extends with its longitudinal direction in the circumferential direction, of the final device, and forms the side walls, and runs with its transverse direction parallel to the axial direction, of the final device. In the installed state of the device, the support body can thus lie flat with its radially externally lying outer side against an inner side, facing the respective gas path, of a line directing the gas (a flow structure defining a flow path).

Particularly advantageously, the guide blades can be formed integrally on the web material and bent therefrom, whereby as a result the device can be realized in a favourably priced manner.

Such a "flat" cross section through which a flow can flow is characterized in that it has a diameter (dimension) in a first direction running perpendicularly to the axial direction that is larger than a diameter (dimension) in a second direction running perpendicularly to the axial direction and perpendicularly to the first direction. In particular, the diameter in the one direction can be at least twice the size as in the other direction. The two diameters intersect one another, in this case, in a central point of the cross section. Because of this, circular cross sections are excluded from the flat cross sections, while oval and elliptical cross sections are or can likewise be flat. The terms "long" and "short" must not be understood absolutely but relatively to one another, in this case, so that the long side walls in the circumferential direction are longer than the short side walls. Depending on the geometry of the cross section of the device through which a flow can flow, the long side walls are practically flat while the short side walls can be curved.

According to a particularly advantageous embodiment, the guide blades are arranged, in particular angled within the respective guide blade row so that the respective guide blade row can be subjected to a swirl-free through-flow by the exhaust gas. This means that the exhaust gas flow while flowing through such a guide blade row is not subjected to any swirl loading, but only to a lateral deflection through the respective guide blade. Insofar as a plurality of guide blade rows is provided, each guide blade row is practically designed so that it can be subjected to a swirl-free through-flow of the exhaust gas flow.

The individual guide blades can be configured flat. Flat guide blades always have the same blade angle relative to the exhaust gas flow or relative to the axial direction along its longitudinal direction. Likewise it is possible in principle to provide at least one or all guide blades with a twist, so that their blade angle varies along the longitudinal direction of the guide blade.

According to an advantageous embodiment, the guide blades can be arranged on the respective side wall on an onflow side or on an outflow side or both on the inflow side as well as on the outflow side. Accordingly, a guide blade row on the inflow side or a guide blade row on the outflow side can be formed on the respective long side wall. Likewise, two guide blade rows can be formed on the respective long side wall, namely one each on the two axial ends of the respective long side wall.

With another advantageous embodiment, the guide blades can be arranged on both long side walls each on at least one axial end. This means that on the inflow side or outflow side or both on the inflow side as well as on the outflow side of both long side walls, guide blades stand away in the direction of the other long side wall located opposite. For example, a common guide blade row can be formed on the respective axial end because of this, in which the guide blades of the two long side walls alternate. In other words, in this case the guide blades of the two long side walls are laterally arranged next to one another in the longitudinal direction of the respective guide blade row.

Alternatively, the guide blades of the respective long side wall can each extend up to a longitudinal center plane, which runs in the middle between the long side walls. In this manner, the guide blades of the two long side walls each form a separate guide blade row on both sides of the longitudinal center plane, so that on the respective axial end two guide blade rows running parallel are provided.

According to a particularly advantageous embodiment, the guide blades can each end in a free-standing manner. This means that the respective guide blade has a free-standing end distally from the associated long side wall, from which it originates. Thus, the guide blades are without contact, i.e. contact-free relative to the long side wall located opposite and contact-free relative to the other guide blades of the same long side wall or of the long side wall located opposite.

Within the respective guide plate row, the associated guide plates can practically each have the same blade angle relative to the axial direction. In guide blade rows, which are arranged on different axial ends and which are arranged on the same long side wall or on opposite long side walls, the guide blades can have blade angles that are opposite to the axial direction. If for example the guide blade row through which the flow flows first uniformly leads to a flow deflection in the one direction on the associated guide blades, the through-flow of the guide blade row through which the flow subsequently flows uniformly leads to a deflection of the exhaust gas flow on the individual guide blades in the other direction, i.e. in the opposite direction. This produces an intensive mixing-through of the evaporated educt and of the exhaust gas flow.

In addition, it is possible in principle in the gas of guide blade rows, which are arranged on the same axial end, however on opposite long side walls, to angle the guide blades opposite to the axial direction, as a result of which an intensive mixing-through can likewise be realized.

According to another advantageous embodiment, at least two guide blades which are arranged on the same long side wall and on the same axial end can have different blade lengths, with which they stand away from the respective long side wall, and/or have different blade widths, which are measured transversely to the blade longitudinal direction. In other words, within the respective guide blade row, the individual guide blades can be differently long and/or wide. Because of this, it is possible on the one hand to equip the long side wall with a curved contour or with a curved profile transversely to the axial direction. On the other hand, by varying the guide blade lengths and/or widths, a desired lower through-flow resistance within the device can be adjusted.

According to another advantageous embodiment, at least two guide blades which are arranged on the same long side wall and on the same axial end, can be angled differently or opposite to the axial direction. In this case, the guide blades are thus not identical within the respective guide blade row, but differently angled relative to the axial direction. Through this measure, an inhomogeneous speed distribution that is present at the place of the device in the cross section of the exhaust gas path can be suitably taken into account in order to be able to achieve altogether a homogenisation of the exhaust gas flow with comparatively low through-flow resistance. It is conceivable for example that the device is positioned in the exhaust gas path at a point in which the exhaust gas path has no straight but a curved profile, so that the exhaust gas flow flows through a curve or a bend. Higher flow velocities are then present radially outside than radially inside.

With a further advantageous embodiment, a plurality of guide blade places (sites) can be regularly arranged next to one another along the respective long side wall on the respective axial end transversely to the axial direction, wherein the number of the guide blades which are arranged in each case in such a guide blade place is smaller than the number of the guide blade places, so that at least in one such guide blade place a gap is arranged. In other words, within the respective guide blade row, the guide blade places define positions for the arrangement of guide blades, wherein the guide blade places make possible a regular stringing together of guide blades. In other words, a number of potential guide blade sites are provided and not all of the sites are provided with a guide blade. Through the omission of at least one guide blade a gap is then created in the respective guide blade place. In the location of the gap, the through-flow resistance is reduced, as a result of which an adjustment of the through-flow resistance of the device to the local conditions is altogether possible. Alternatively to such a regular arrangement of guide blades and gaps by means of predetermined guide blade places it is likewise possible in principle to freely select the positions of the adjacent guide blades with respect to their spacing to one another within the respective guide blade row, so that the guide blades can have varying distances to one another.

With another advantageous embodiment, all guide blades can be integrally formed on the respective long side wall, as a result of which the device can be produced particularly easily and thus cost-effectively. Particularly effective, in this case, is an embodiment, wherein all side walls are integrally formed on the support body, which likewise results in a simple and thus cost-effective design. In particular, the design can be a shaped sheet metal part of a web material, which can be simply produced from a single sheet metal body or respectively web material body through punching and forming. Preferentially, the components of the device are produced from metal. Insofar as a long sheet metal strip is used as starting material from which the guide blades are initially cut free and angled-off and which is subsequently bent over for forming the support body with the long and the short side walls, the support body can be closed in the circumferential direction in that in the region of one of the short side walls the longitudinal ends of the original sheet metal strip are connected to each other, either as joint or with overlap.

An exhaust system according to the invention comprises at least one SCR catalytic converter, a reduction agent feeding device, which comprises at least one injector for feeding a reduction agent to the exhaust gas flow upstream of the SCR catalytic converter, and at least one mixing and/or evaporating device of the type described above, which is arranged between the at least one injector and the at least SCR catalytic converter.

By contrast, an SCR catalytic converter according to the invention comprises a housing in which at least one SCR catalytic converter element is arranged, and at least one mixing and/or evaporating device of the type described above, which is arranged in the housing of the SCR catalytic converter upstream of the at least one SCR element.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
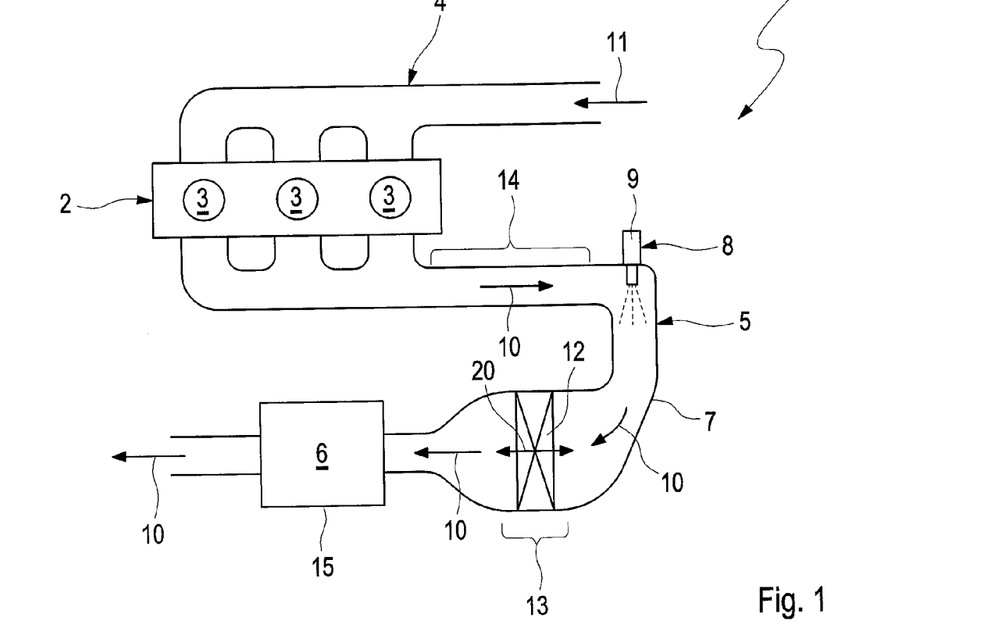
FIG. 1 is a highly simplified schematic representation in the manner of a circuit diagram of a combustion engine with an exhaust system according to the invention.

According to FIG. 1, a combustion engine 1 comprises in the usual manner an engine block 2, which comprises a plurality of cylinders 3. A fresh air system 4 supplies the cylinders 3 of the engine block 2 with fresh air. A corresponding fresh air stream in this case is indicated by an arrow 11. During the operation of the combustion engine 1, an exhaust system 5 leads combustion exhaust gases away from the cylinders 3 of the engine block 2. Furthermore, the exhaust system 5 brings about an exhaust gas cleaning or exhaust gas retreatment. To this end, the exhaust system 5 is equipped with at least one SCR catalytic converter 6, which is incorporated in an exhaust gas line 7 of the exhaust system 5 in a suitable manner. Furthermore, the exhaust system 5 comprises a reduction agent feeding device 8, which comprises at least one injector 9, with the help of which a reduction agent can be introduced into an exhaust gas flow 10, which during the operation of the combustion engine 1 flows in the exhaust gas line 7 and is indicated by arrows. Injecting the liquid reduction agent into the exhaust gas flow 10 in this case takes place upstream of the SCR catalytic converter 6.

Furthermore, the exhaust system 5 comprises at least one mixing and/or evaporating device 12, which in the following is designated device 12 in short. The device 12 in this case is arranged in the exhaust gas line 7 between the injector 9 and the SCR catalytic converter 6, so that the exhaust gas with the fed-in reduction agent first has to flow through the device 12 before the mixture reaches the SCR catalytic converter 6.

In a region 13, in which the device 12 is arranged, the exhaust gas line 7 can have a flat through-flow cross section while for example in a region 14, which is located upstream of the injector 9, a circular cross section can be present. In this case, the cross-sectional areas can be identical in size or different in size in the sections 13, 14.

With the embodiment shown in FIG. 1, the device 12 is arranged in the exhaust gas line 7 upstream of the SCR catalytic converter 6 and thus provided separately from the SCR catalytic converter 6. In particular, the device 12 is located outside a housing 15 of the SCR catalytic converter 6, in this case.

Figure 2:
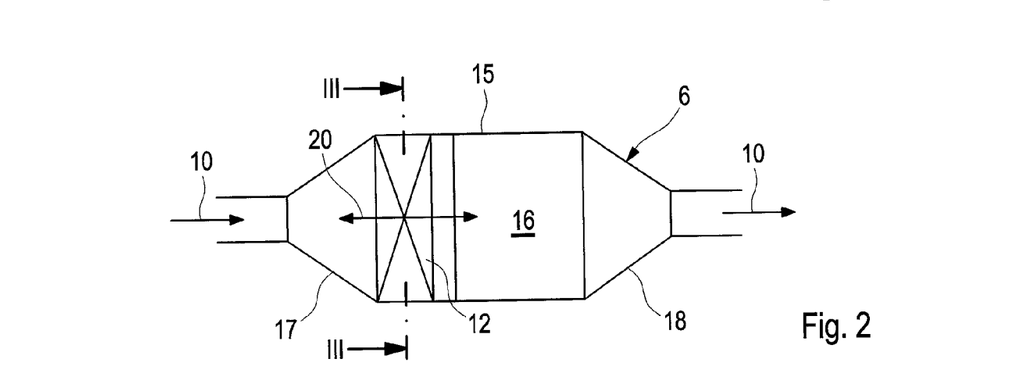
FIG. 2 a highly simplified view of an SCR catalytic converter in the manner of a circuit diagram.

In contrast with this, FIG. 2 shows an embodiment, wherein the SCR catalytic converter 6 and the device 12 form an integral unit. To this end, at least one SCR catalytic converter element 16 is arranged in the housing 15 of the SCR catalytic converter 6, wherein in the housing 15 upstream of this SCR catalytic converter element 16 the device 12 is additionally arranged. Thus, the device 12 and the SCR catalytic converter element 16 are arranged in a common housing 15. In the example of FIG. 2, the housing 15 comprises an inlet funnel 17 and an outlet funnel 18, wherein the device 12 and the SCR catalytic converter element 16 are arranged between the two funnels 17, 18.

Figure 3:
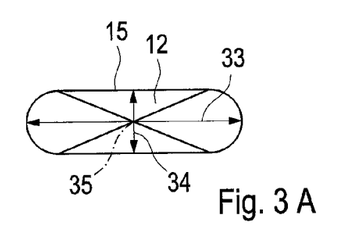
FIG. 3A is a schematic cross sectional view of the SCR catalytic converter corresponding to the section lines III in FIG. 2 according to one embodiment.
FIG. 3B is a schematic cross sectional view of the SCR catalytic converter corresponding to the section lines III in FIG. 2 according to another embodiment.

According to the FIGS. 3A and 3B, the housing 15 can have a flat cross section at least in the region of the device 12, to which the respective device 12 is adapted. FIG. 3A in this case shows an embodiment, wherein the cross section of the housing 15 through which a flow can flow is filled out with the help of a single device 12. In contrast with this, FIG. 3B shows an embodiment, wherein the cross section of the housing 15 through which a flow can flow is filled out with the help of two devices 12 arranged next to each other. In a similar manner this applies also to the arrangement of the device 12 in the exhaust gas line 7, so that there are at least two devices that can also be arranged next to each other in the region 13 in order to fill out the cross section of the exhaust gas line 7 through which a flow can flow. Such a "flat" cross section through which a flow can flow is characterized in that in a first direction running perpendicularly to an axial direction of the device 12 running perpendicularly to the plane of the drawing in FIGS. 3A and 3B, it has a first diameter (dimension) 33 which is greater than a second diameter (dimension) 34 in a second direction running perpendicularly to the axial direction and perpendicularly to the first direction. In particular, the first diameter 33 in the one direction can be at least twice as great as the second diameter 34 in the other direction. The two diameters 33, 34 intersect one another, in this case, in a central point 35 of the respective cross section.

According to the FIGS. 4-13, the respective device 12 comprises a support body 19. The support body 19 is shaped so that it encloses transversely to an axial direction 20, which is indicated in the FIGS. 1, 2 and 4-13 by a double arrow, a flat cross section of the device 12 through which a flow can flow, in a circumferential direction 32. The axial direction 20 in this case corresponds to a main through-flow direction of the device 12 during the operation of the exhaust system 5. Since the cross section of the device 12 through which a flow can flow is flat, the support body 19 has two long side walls 21, 22 which are located opposite each other, as well as two short side walls 23, 24, which are likewise located opposite each other. In this case, the short side walls 23, 24 each connect the two long side walls 21, 22.

In addition, the device 12 is equipped with a plurality of guide blades 25, each of which in this case stand away from one of the long side walls 21, 22 in the direction of the other long side wall 21, 22 and in the process stand away from an axial end 26 or 27 of the device 12 or of the support body 19 or the respective long side wall 21, 22. Insofar as the exhaust gas flow is orientated corresponding to the arrow 10, the one axial end 26 first subjected to an inflow forms an inflow side, which in the following is likewise designated 26, while the other axial end 27 then forms an outflow side, which in the following is likewise designated 27.

The guide blades 25 each extend linearly as well as parallel to each other. Furthermore, the guide blades 25 in the case of the embodiments shown, in this case, are likewise configured flat. In addition, they are angled relative to the axial direction 20. With the shown examples, a blade angle of the guide blades 25 amounts to 45° each relative to the axial direction 20 within the scope of usual manufacturing tolerances.

The guide blades 25 extend transversely to the axial direction 20 and are additionally arranged transversely to their longitudinal extension and transversely to the axial direction 20 next to one another in a row, which can also be described as blade row 28.

Figure 4:
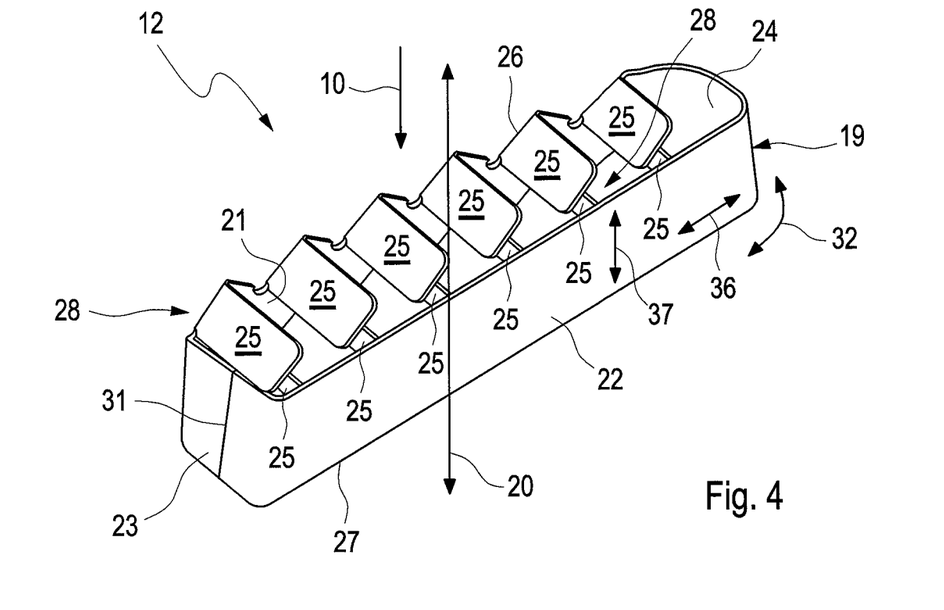
FIG. 4 is an isometric view showing a mixing and/or evaporating device according to an embodiment of the invention.

FIG. 4 shows an embodiment, wherein exclusively on the one long side wall 21, guide blades 25 are arranged, wherein on this side wall 21 both on the inflow side 26 as well as on the outflow side 27, guide blades 25 are arranged, which stand away in the direction of the other side wall 22. Accordingly, two guide blade rows 28 are provided, in this case, namely a blade row 28 on the inflow side and a blade row 28 on the outflow side.

Figure 5:
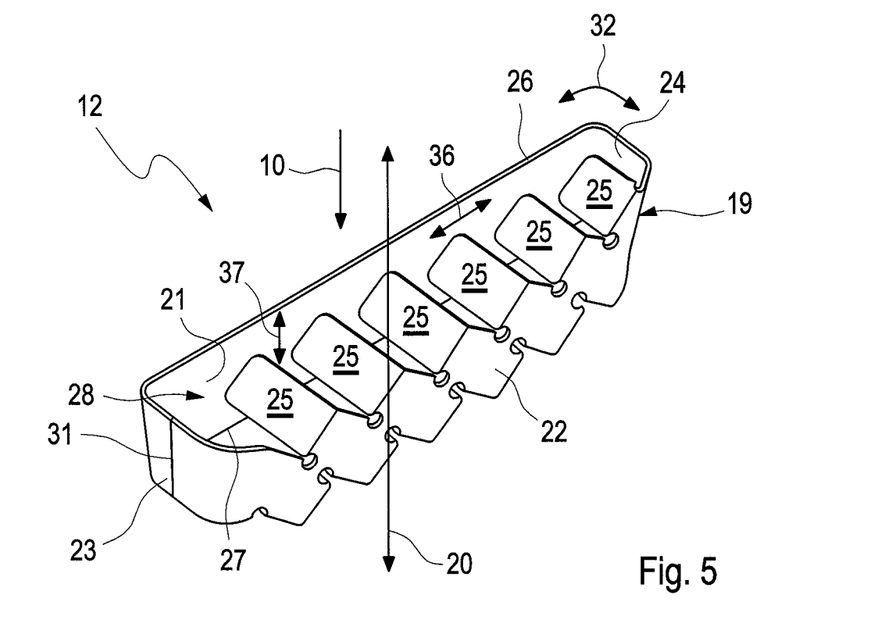
FIG. 5 is an isometric view showing a mixing and/or evaporating device according to another embodiment of the invention.
Figure 6:
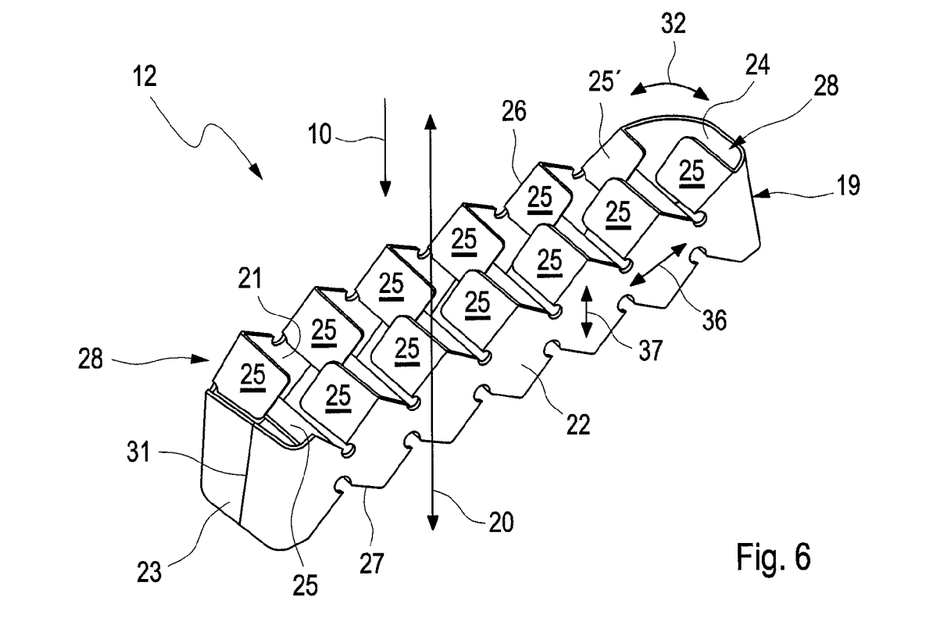
FIG. 6 is an isometric view showing a mixing and/or evaporating device according to another embodiment of the invention.
Figure 7:
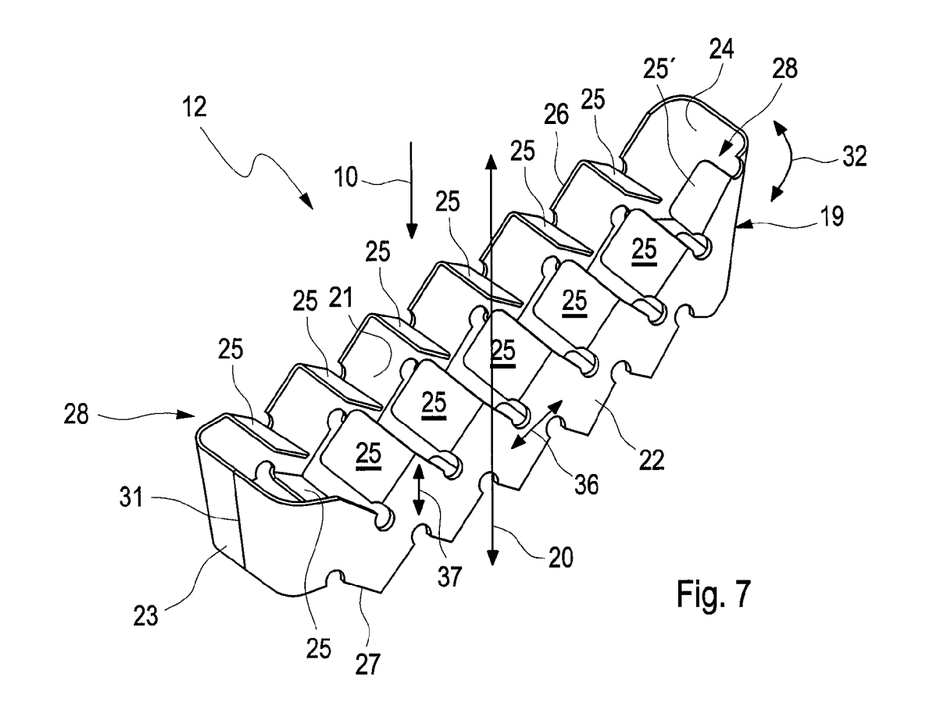
FIG. 7 is an isometric view showing a mixing and/or evaporating device according to another embodiment of the invention.
Figure 8:
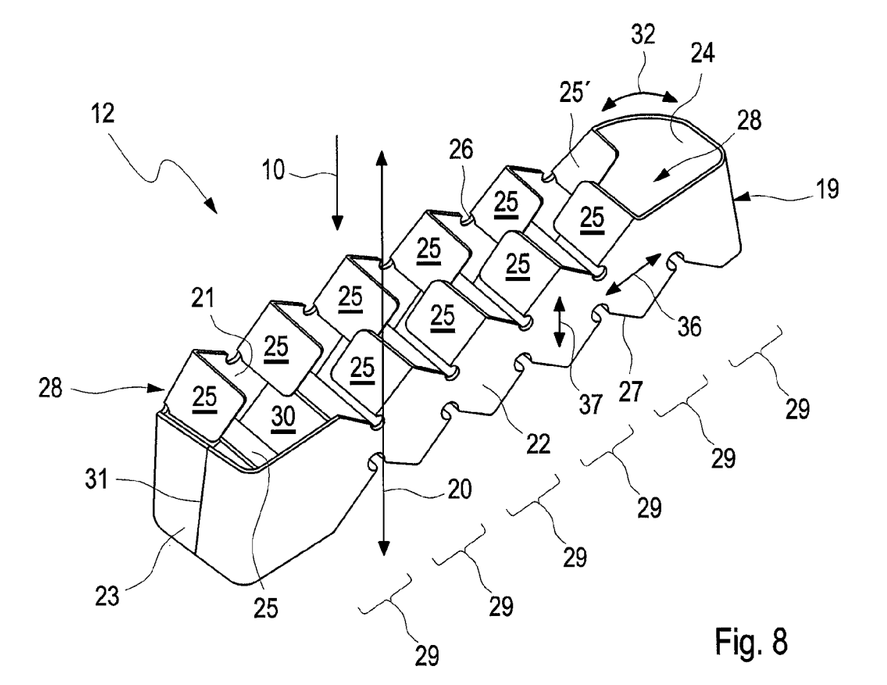
FIG. 8 is an isometric view showing a mixing and/or evaporating device according to another embodiment of the invention.
Figure 9:
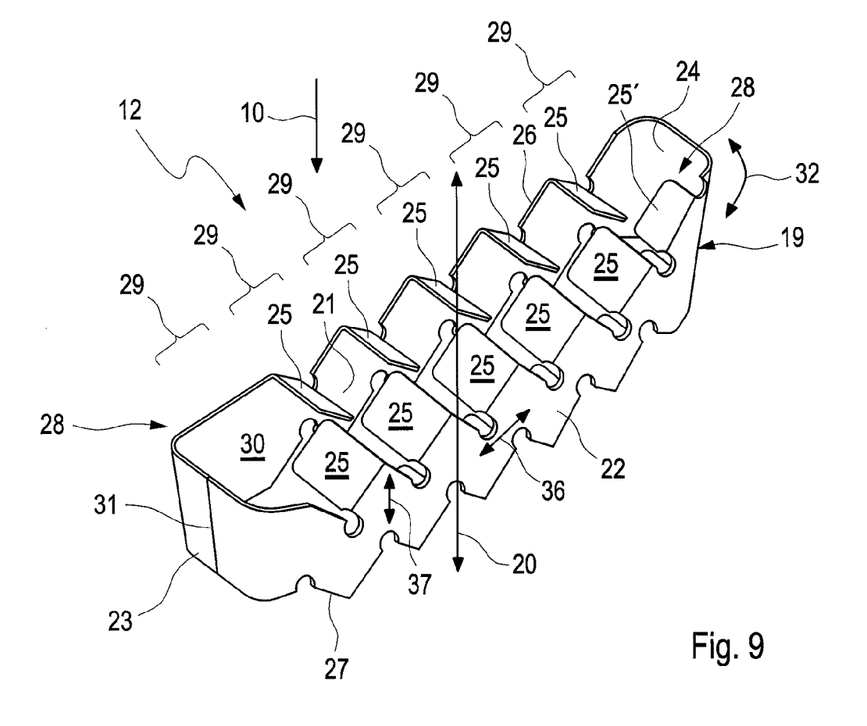
FIG. 9 is an isometric view showing a mixing and/or evaporating device according to another embodiment of the invention.
Figure 10:
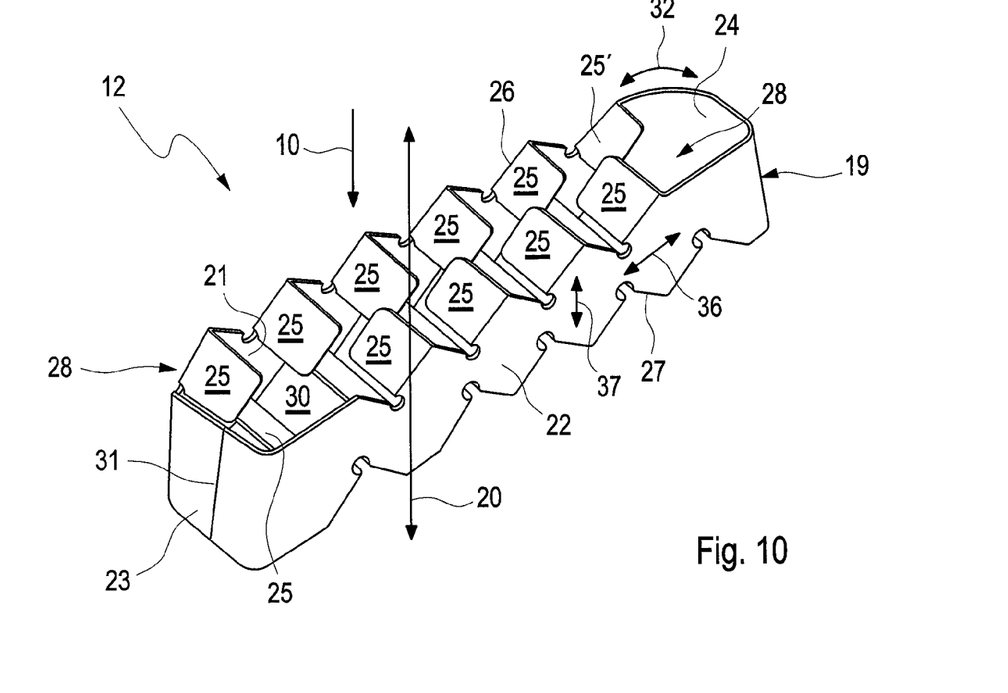
FIG. 10 is an isometric view showing a mixing and/or evaporating device according to another embodiment of the invention.

In contrast with this, FIG. 5 shows an embodiment, wherein only one single blade row 28 is provided, the guide blades 25 of which are arranged on the inflow side on the one long side wall and extend to the other long side wall 21.

With the embodiments of the FIGS. 6-13 it is provided, by contrast, that on both long side walls 21, 22 at least on one axial end 26, 27 guide blades 25 are each arranged, which stand away in the direction of the other long side wall 21, 22. With the embodiments shown, in this case, two blade rows 28 each arranged next to each other and running in parallel to each other are provided on the respective axial end 26, 27, i.e. on the inflow side 26 and on the outflow side 27 because of this. Exemplarily, the guide blades 25 located opposite each other are dimensioned so that they extend, starting out from the associated long side wall 21, 22 as far as to a longitudinal center plane, which runs in the middle between the two long side walls 21, 22. Alternatively, the guide blades 25 of the two long side walls 21, 22 can extend in the direction of the other side wall 21, 22 so far that the guide blades 25 of the one long side wall 21 extend as far as into the gaps between adjacent guide blades 25 of the other side wall 22, so that ultimately a common guide blade row 28 is formed, which is formed through the guide blades 25 of the two long side walls 21, 22, wherein within this common guide blade row 28 the guide blades 25 of the two long side walls 21, 22 alternate.

With the embodiments shown, in this case, the guide blades 25 are each arranged and dimensioned so that they end spaced from the respective long side wall 21, 22 from which they originate, in a free-standing manner. Thus, the guide blades 25 of the embodiments of the FIGS. 4 and 5 are in particular contact-free to the respective long side wall 21, 22 located opposite. The guide blades 25 of the embodiments of the FIGS. 6-13 are in particular contact-free to the other guide blades 25.

Insofar, as is evident in the embodiments of the FIGS. 4, 6, 8, 10, 12, guide blades 25 are provided on both axial ends 26, 27, these can be practically angled opposite to the axial direction 20. This means that the guide blades 25 of a blade row 28 on the inflow side are angled in the one direction relative to the axial direction 20, while the guide blades 25 of a blade row 28 on the outflow side are then angled in the other direction, i.e. in the opposite direction to the axial direction 20.

The FIGS. 6, 8, 10, 12 shows embodiments, wherein the guide blades 25, which are arranged on the same axial end 26, 27, but on different-length side walls 21, 22, i.e. in two blade rows 28, are each angled with the same angle relative to the axial direction 20. In contrast with this, the FIGS. 7, 9, 11, 13 show embodiments, wherein the guide blades 25, which are arranged on the same axial end 26, 27, but on opposite long side walls 21, 22, are angled opposite to the axial direction 20. In other words, on the inflow side 26 and/or on the outflow side 27, the guide blades 25 of the one blade row 28, which are formed on the one long side wall 21, are angled relative to the axial direction 20 opposite to the guide blades 25 of the other blade row 28, which are formed on the other long side wall 22.

At least with the embodiments of FIGS. 5-13, a guide blade 25" is evident within at least one blade row 28, which with respect to the other guide blades 25 has a smaller blade length.

Figure 11:
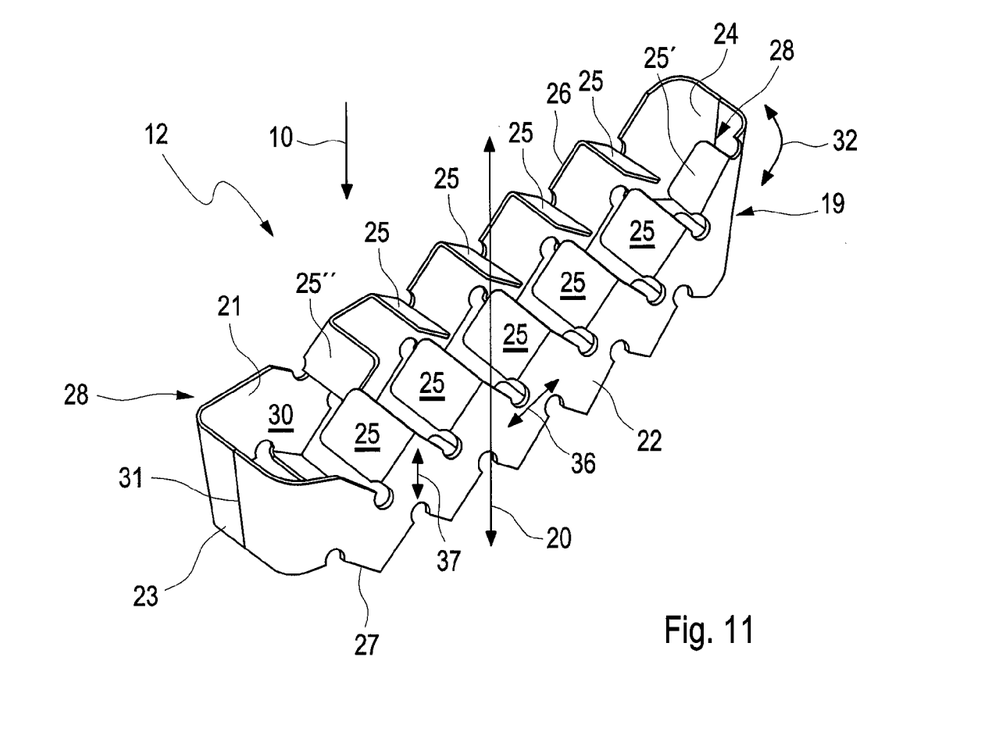
FIG. 11 is an isometric view showing a mixing and/or evaporating device according to another embodiment of the invention.

FIG. 11 shows an embodiment, wherein within one of the blade rows 28 one of the guide blades 25" is angled opposed to the remaining guide blades 25 of this guide blade row 28 relative to the axial direction.

Figure 12:
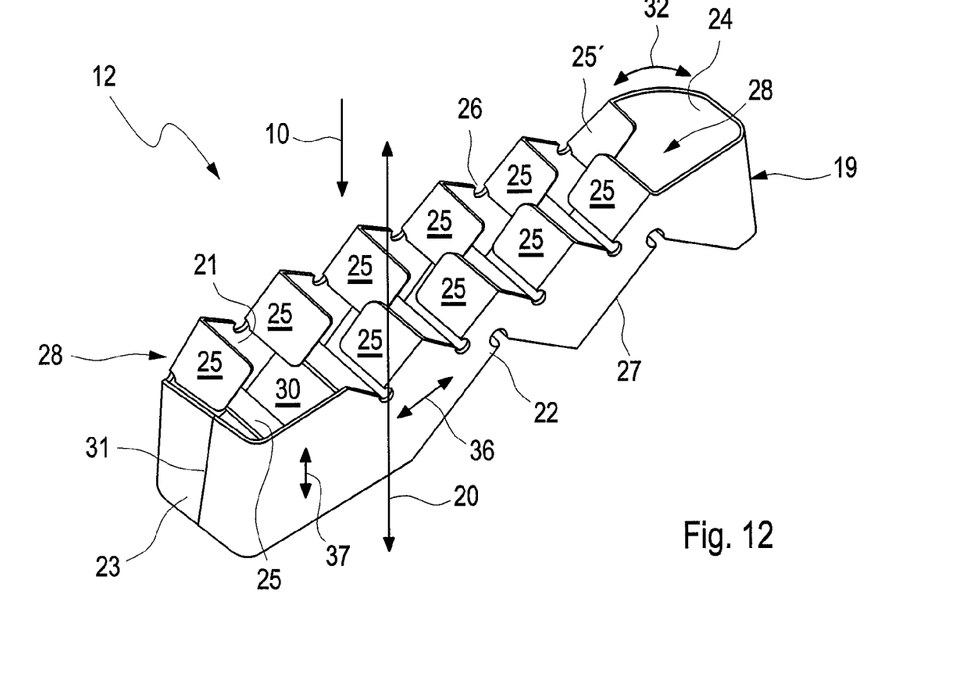
FIG. 12 is an isometric view showing a mixing and/or evaporating device according to another embodiment of the invention.
Figure 13:
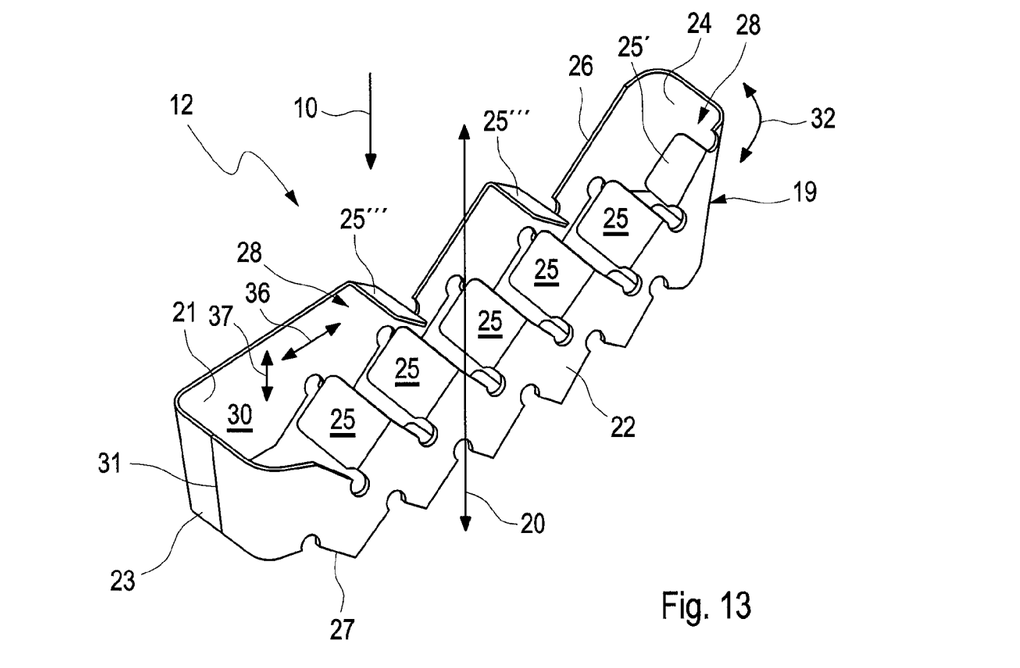
FIG. 13 is an isometric view showing a mixing and/or evaporating device according to still another embodiment of the invention.

The FIGS. 12 and 13 shows embodiments, wherein the guide blades 25 of the one blade row 28 have a blade width other than the guide blades 25 of the other blade row 28. Exemplarily, the guide blades 25""' which are arranged on the inflow side on the one long side wall 21 in FIG. 13 are approximately twice as wide as the guide blades 25 of the blade row 28 arranged on the opposite long side wall 22.

The FIGS. 8-13 additionally show a configuration, in which along the respective long side wall 21, 22 on the respective axial end 26, 27, transversely to the axial direction 20, a plurality of guide blade places 29 are arranged regularly that is with regular spacings next to one another. While with the embodiments of FIGS. 4-7 the number of guide blade places 29 coincides with the number of the guide blades 25, so that in each guide blade place 29 a guide blade 25 is arranged, at least one guide plate 25 is missing with the embodiments of the FIGS. 8-13, so that in at least one such guide blade place 29 there is a gap 30.

It is clear that in principle the versions explained by means of the individual embodiments of the FIGS. 4-13, can also be combined with one another as required.

In the example, the support body 19 is a shaped sheet metal part of a flat web material, which integrally comprises the four side walls 21, 22, 23, 24. Furthermore, the guide blades 25 are integrally formed on the respective long side wall 21, 22, so that ultimately the complete device 12 is produced from a single shaped sheet metal part. In this case, the production can be effected out of a long-stretched strip-like or web-shaped sheet metal blank or web material body, wherein initially the guide blades 25 are cut free. Following this, the guide blades 25 are angled off. Finally, the sheet metal strip or respectively the web material body can be bent corresponding to the flat cross section of the device 12 through which a flow can flow in order to form the long and short side walls 21, 22, 23, 24 of the support body 19. The longitudinal ends of the blank can be fastened to each other on the one short side wall 23 corresponding to a connecting seam 31. In the deformed state, the web material of the web material body extends with its longitudinal direction 36 in the circumferential direction 32 and forms, in this case, the side walls 21, 22, 23, 24 and runs with its transverse direction 37 parallel to the axial direction 20.

While specific embodiments of the invention have been shown and described in detail to illustrate the application of the principles of the invention, it will be understood that the invention may be embodied otherwise without departing from such principles.

What is claimed is:

1. A mixing and/or evaporating device for an exhaust system of a combustion engine, the device comprising a support body enclosing, in a circumferential direction, a flat cross section of the device running transversely to an axial direction of the device through which a flow can flow, the support body comprising:
   two long side walls located opposite each other and two short side walls located opposite each other, said two short side walls each connecting said two long side walls to each other; and
   a plurality of guide blades arranged on one of said long side walls at least on one axial end thereof, said plurality of guide blades extending away from said one of said long side walls in a direction of another of said long side walls and said plurality of guide blades being angled relative to the axial direction of the device, each of said plurality of guide glades comprising a fluid engaging surface, said fluid engaging surface extending from a position at or adjacent to said one of said long side walls to a position located at a spaced location from said another of said long side walls, said fluid engaging surface of one of said plurality of guide blades being located opposite said fluid engaging surface of another one of said plurality of guide blades with respect to said mixing and/or evaporating device axial direction.

2. The device according to claim 1, wherein the guide blades project perpendicularly from said one of the long side walls.

3. The device according to claim 1, wherein the support body is produced from a flat web material by deformation, the flat web material extending with a transverse direction parallel to the axial direction and with a longitudinal direction being deformed in a circumferential direction to form said side walls.

4. The device according to claim 3, wherein said plurality of guide blades are formed integrally from the web material and are bent therefrom.

5. The device according to claim 1, wherein in the flat cross section a first dimension, which extends perpendicularly to the axial direction, is at least twice as great as a second dimension, which extends perpendicularly to the axial direction and perpendicularly to the extent of said first dimension.

6. The device according to claim 1, wherein the device has an outflow side and an inflow side and at least one of:
   said plurality of guide blades arranged on one of said long side walls are arranged on the outflow side;
   said plurality of guide blades arranged on one of said long side walls are arranged on the inflow side;
   said plurality of guide blades arranged on one of said long side walls are arranged on the inflow side and another plurality of guide blades are arranged on said another of said long side walls on the outflow side; and
   said plurality of guide blades arranged on one of said long side walls are arranged respectively on at least one axial end and another plurality of guide blades are arranged on said another of said long side walls on at least one axial end.

7. The device according to claim 1, wherein:
   another plurality of guide blades are arranged on said another of said long side walls to provide a plurality of guide blades arranged on both long side walls, each of said plurality of guide blades extending as far as a longitudinal center plane, which runs in a middle between said long side walls.

8. The device according to claim 1, wherein the guide blades each end in a free-standing manner.

9. The device according to claim 1, wherein at least one of:
   the guide blades are arranged on different axial ends and the guide blades are angled opposite one another with respect to the axial direction; and
   the guide blades are arranged at the same axial end on opposite long side walls and are angled opposite each other with respect to the axial direction.

10. The device according to claim 1, wherein along said one of said long side walls on the axial end thereof, extending transversely to the axial direction, a plurality of guide blade areas are regularly arranged next to one another, wherein the number of the guide blades, which are each arranged in each guide blade area, is smaller than the number of the guide blade areas, whereby at least in one guide blade area a gap is arranged.

11. The device according to claim 1, wherein at least one of:
all of said plurality of guide blades are integrally formed with said one of said long side walls;
each of said two long side walls and two short side walls are integrally formed with a remainder of the support body; and
each of said two long side walls and two short side walls and all of said guide blades are produced from a single web material body by deformation.

12. An exhaust system for a combustion engine of a motor vehicle, the system comprising:
a flow structure defining a flow path for an exhaust gas flow;
a SCR catalytic converter operatively connected to said flow structure for flow through by at least a portion of the exhaust gas flow;
a reduction agent feeding device comprising at least one injector for feeding a reduction agent to the exhaust gas flow, the injector being disposed upstream of said SCR catalytic converter; and
a mixing and/or evaporating device comprising a support body enclosing a cross section running transversely to a mixing and/or evaporating device axial direction, the mixing and/or evaporating device comprising two long side walls located opposite each other and two short side walls located opposite each other, said two short side walls each connecting said two long side walls to each other and a plurality of guide blades arranged on one of said long side walls at least on one axial end thereof, each of said plurality of guide blades extending away from said one of said long side walls in a direction of another of said long side walls and said plurality of guide blades being angled relative to the mixing and/or evaporating device axial direction, each of said plurality of guide glades comprising a fluid engaging surface, said fluid engaging surface extending from a position at or adjacent to said one of said long side walls to a position located at a spaced location from said another of said long side walls, said fluid engaging surface of one of said plurality of guide blades being located opposite said fluid engaging surface of another one of said plurality of guide blades with respect to said mixing and/or evaporating device axial direction, the mixing and/or evaporating device being arranged in the flow path between said injector and said SCR catalytic converter.

13. The system according to claim 12, wherein:
the flow structure defining a flow path comprises a housing;
said SCR catalytic converter element is arranged in said housing;
said mixing and/or evaporating device is arranged in said housing upstream of said SCR catalytic converter element.

14. The system according to claim 12, wherein said plurality of guide blades have different blade lengths.

15. The system according to claim 12, wherein said plurality of guide blades have different blade widths.

16. A combustion engine exhaust system mixing and/or evaporating device comprising a support body enclosing a volume, said support body comprising:
a first long side wall and having a first axial end at a first side of said volume and having a second axial end at a second side of said volume;
a second long side wall located opposite to said first long side wall and having a first axial end at a first side of said volume and having a second axial end at a second side of said volume;
a first short side wall connecting said first long side wall to said second long side wall;
a second short side wall connecting said first long side wall to said second long side wall; and
a plurality of guide blades directly connected to said first long side wall at said first axial end and extending in a direction away from said first long side wall toward said second long side wall, each of said plurality of guide blades being angled relative to an axial direction of the device, each of said plurality of guide blades having a fluid engaging surface, said fluid engaging surface being angled relative to the axial direction of the device, said fluid engaging surface extending from a first position to a second position, said first position being located at or adjacent to said first long side wall, said second position being located at a spaced location from said second long side wall, wherein said fluid engaging surface of one of said plurality of guide blades is located opposite another one of said guide blades with respect to the axial direction of the device.

17. The device according to claim 16, wherein said guide blades project perpendicularly from said first long side wall, wherein one or more of:
said plurality of guide blades have different blade lengths;
said plurality of guide blades have different blade widths;
said plurality of guide blades are set different relative to the axial direction; and
said plurality of guide blades are opposite to one another relative to said axial direction.

18. The device according to claim 16, wherein said support body is produced by a process comprising the steps of:
providing a flat web material;
deforming the flat web material to form said first long side wall, said second long side wall, said first short side wall, said second short side wall and said plurality of guide blades.

19. The device according to claim 16, wherein:
another plurality of guide blades are connected to one of said first long side wall and said second long side walls.

20. The device according to claim 16, wherein said support body has a first dimension in a first direction which is greater than a second dimension in a second direction, said second direction extending perpendicularly to the axial direction of the device and extending perpendicularly to said first direction.

* * * * *